United States Patent
Coverston et al.

(10) Patent No.: US 7,933,875 B2
(45) Date of Patent: Apr. 26, 2011

(54) FILE SYSTEM WITH DISTRIBUTED COMPONENTS

(75) Inventors: Harriet G. Coverston, New Brighton, MN (US); Anton B. Rang, Houlton, WI (US); Brian D. Reitz, Apple Valley, MN (US); Andrew B. Hastings, Eagan, MN (US)

(73) Assignee: Sun Microsystems, Inc., Santa Clara, CA (US)

( * ) Notice: Subject to any disclaimer, the term of this patent is extended or adjusted under 35 U.S.C. 154(b) by 512 days.

(21) Appl. No.: 11/510,108

(22) Filed: Aug. 24, 2006

(65) Prior Publication Data

US 2008/0052293 A1 Feb. 28, 2008

(51) Int. Cl.
*G06F 17/00* (2006.01)
*G06F 7/00* (2006.01)
(52) U.S. Cl. ......... 707/652; 707/654; 707/812; 707/822
(58) Field of Classification Search .................. None
See application file for complete search history.

(56) References Cited

U.S. PATENT DOCUMENTS

| | | | | |
|---|---|---|---|---|
| 6,078,990 A | * | 6/2000 | Frazier | 711/114 |
| 6,105,122 A | * | 8/2000 | Muller et al. | 712/1 |
| 2003/0105799 A1 | * | 6/2003 | Khan et al. | 709/201 |
| 2006/0150198 A1 | * | 7/2006 | Bendapudi et al. | 719/318 |

* cited by examiner

*Primary Examiner* — Greta L Robinson
*Assistant Examiner* — James J Wilcox
(74) *Attorney, Agent, or Firm* — Brooks Kushman P.C.

(57) ABSTRACT

A distributed file system is disclosed which may include one or more input/output (I/O) nodes and one or more compute nodes. The I/O nodes and the compute nodes may be communicably coupled through an interconnect. Each compute node may include applications to perform specific functions and perform I/O functions through libraries and file system call handlers. The file system call handlers may be capable of providing application programming interfaces (APIs) to facilitate communication between the plurality of I/O nodes and the applications. The file system call handlers may use a message port system to communicate with other compute nodes.

13 Claims, 9 Drawing Sheets

FILE SYSTEM WITH DISTRIBUTED COMPONENTS

FIELD OF INVENTION

An embodiment of the invention relates to the storage of data, and more particularly to a distributed file system architecture.

BACKGROUND OF INVENTION

Computer systems have long been used to manage business related information. However, costs associated with storage, communication and information processing prohibited the use of computers to store and to manage other kinds of data. When costs came down, it became feasible to digitize and store other forms of data, including digitized data. Digitized data primarily consists of digitized visual images, audio and video, although is not limited to those types of data. Advanced information management system structures are implemented to store and manage digitized data.

In very large-scale computer systems having many independent processing nodes, problems exist in which fast access is unable to be provided to files in the system from a particular processing node.

SUMMARY OF INVENTION

Various embodiments of the invention relate to a distributed file system. In one embodiment, the distributed file system may include one or more input/output (I/O) nodes and one or more compute nodes. The I/O nodes and the compute nodes may be communicably coupled through an interconnect. According to one embodiment, each compute node may include applications to perform specific functions and perform I/O functions through libraries and file system call handlers. The file system call handlers may be capable of providing application programming interfaces (APIs) to facilitate communication between the plurality of I/O nodes and the applications. In some embodiments, the file system call handlers may use a message port system to communicate with other compute nodes.

In one embodiment, an input/output (I/O) node may be communicably coupled to one or more compute nodes. The I/O node may include a distribution manager and a file manager. The distribution manager, in one embodiment, may be capable of locating a directory manager after receiving a file request from a file system call handler associated with a compute node. The directory manager may coordinate access to a single directory and performing all lookup operations. According to one embodiment, the file manager may be responsible for files being accessed by an application running on one of the one or more compute nodes may delegate responsibility for a whole file, or a range within the file, to a subset of the one or more compute nodes.

In one embodiment, a distribution manager provides a lookup service for compute nodes and input/output (I/O) nodes which are communicably coupled. The distribution manager may be configured to receive a request asking for access to a file located within a distributed file system, determine a file manager port number associated with the requested file, and return the file manager port number to the requesting component. In one embodiment, the received request from a requesting component is transmitted via a message port. Once the file manager port number is returned to the requesting component, the requesting component may communicate directly with a storage manager associated with the requested file.

BRIEF DESCRIPTION OF THE DRAWINGS

The invention may be best understood by referring to the following description and accompanying drawings that are used to illustrate embodiments of the invention. In the drawings.

DETAILED DESCRIPTION

A distributed file system is disclosed. In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EE- PROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly herein, a carrier wave shall be regarded as comprising a machine-readable medium.

File System Architecture

Figure 1:
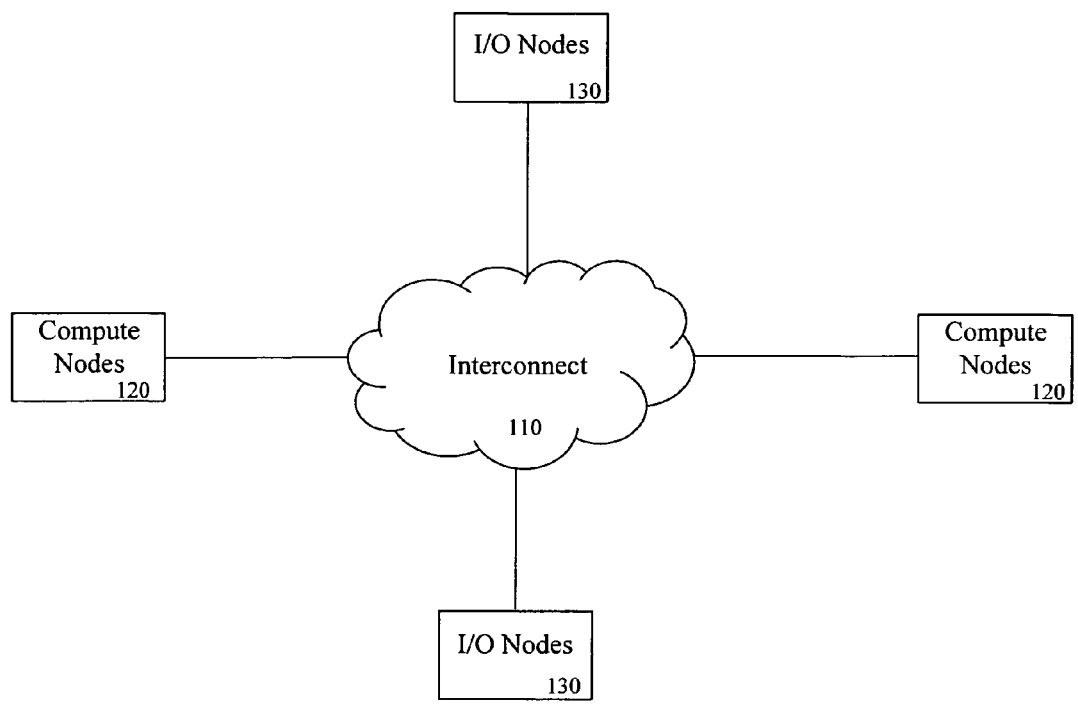
FIG. 1 illustrates one embodiment of a file system network.

FIG. 1 illustrates one embodiment of a file system network 100. Network 100 includes an interconnect 110, which couples compute nodes 120 and input/output (I/O) nodes 130. Compute nodes 120 proxy I/O services implemented in various libraries, and/or system kernel. I/O nodes 130 implement I/O services. In one embodiment, each I/O node 130 runs a dedicated operating system kernel instance. In a further embodiment, services may be user processes and/or kernel threads. Further, I/O hardware (not shown) is coupled to each I/O node 130.

Figure 2:
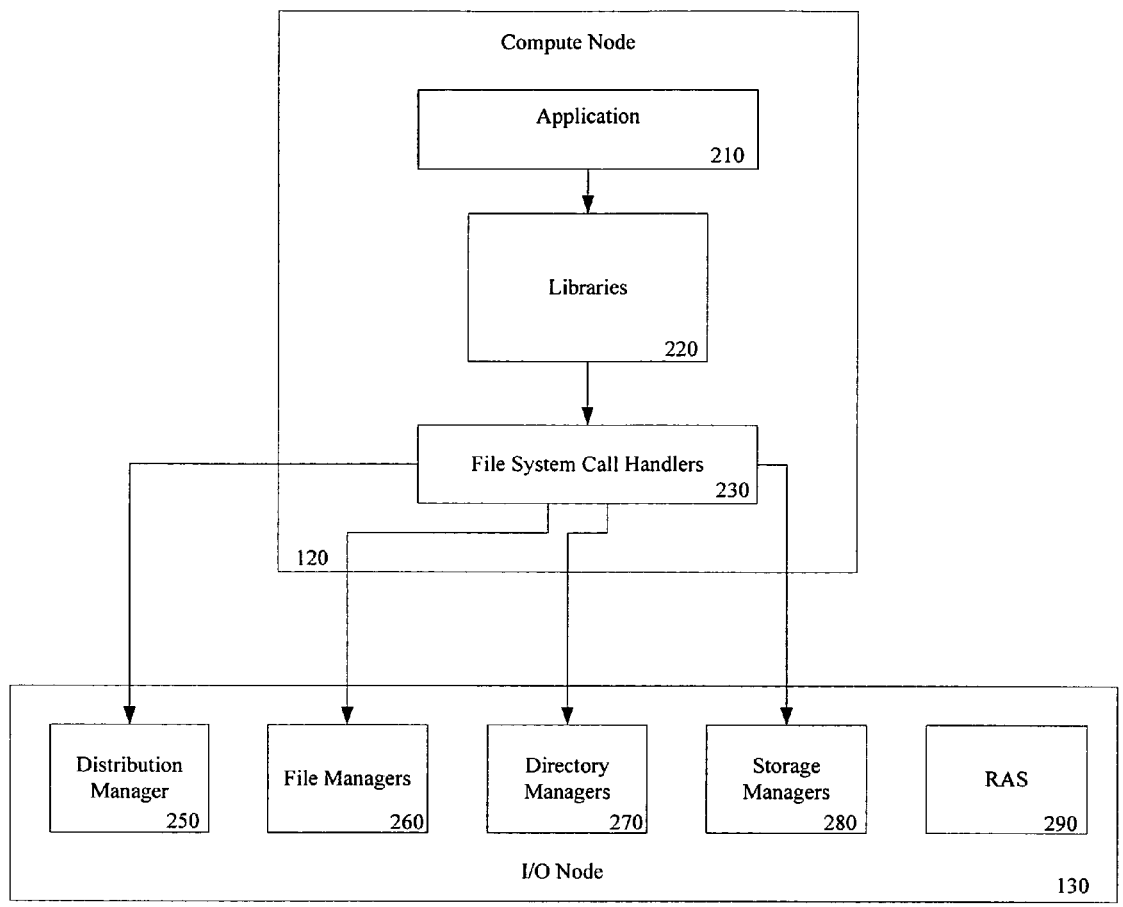
FIG. 2 is a block diagram illustrating one embodiment of a file system architecture.

FIG. 2 is a block diagram of a file system architecture illustrating a more detailed embodiment of a compute node 120 and I/O node 130. Compute node 120 includes application 210, libraries 220 and file system call handlers 230. Application 210 is an application program to perform a specific function. Application 210 performs I/O through libraries 220. Libraries 220 include language support libraries (e.g. libc for C programs, and the library implementing FORTRAN I/O) as well as parallel I/O libraries such as MPI I/O. Providing optimized versions of these libraries allows applications to run more efficiently on the file system with no source code changes.

In one embodiment, file system call handlers 230 communicate with I/O nodes 130. Call handlers 230 provide applications 210 APIs defined by the Portable Operating System Interface (POSIX), as well as other interfaces designed to improve performance of both serial and parallel I/O operations. Call handlers 230 take advantage of shared memory to share state across node boundaries, as well as use a message port system to communicate with other compute nodes 120 and I/O nodes 130.

The message port system is the primary communication mechanism for the file system. However, shared memory may be used for all data transfer. In one embodiment, file system messages are treated as asynchronous remote procedure calls. Whenever a message is received, an available thread runs the requested code on the destination node, and will generally send a reply message after completion.

Messages sent to the local node bypass the interconnect 110, which is useful as the many components of the file system (including one for each open file) are mapped onto a relatively small number of I/O nodes, allowing many operations to be performed locally. In a further embodiment, the file system uses a logging mechanism to ensure that requests sent to an I/O node 130 can be recovered if that node fails. This recovery process is described below in more detail.

File system scalability is achieved by distributing and load balancing components across I/O nodes 130. Thus, I/O nodes 130 include various components (or managers) to carry out functions. File system components can be thought of as objects in an object-oriented programming style. The components are state information together with the methods which operate on that state. In particular the components are very lightweight (e.g., creating a component requires only that its state be allocated and initialized and that a message port be created for method requests). A message sent to a component simply invokes a procedure with that components' state as a parameter.

In one embodiment, components are identified by a unique name. For directories and files, the name is the file number. For storage managers, the name is the unique ID of the storage device. Several components have a globally unique name within the file system (e.g. a distribution manager).

According to one embodiment, I/O node 130 includes one or more distribution managers 250, one or more file managers 260, one or more directory managers 270, one or more storage managers 280 and a RAS component 290. A distribution manager 250 provides a lookup service for compute nodes 120 and I/O nodes 130 to find where messages for other file system components should be directed.

Figure 3A:
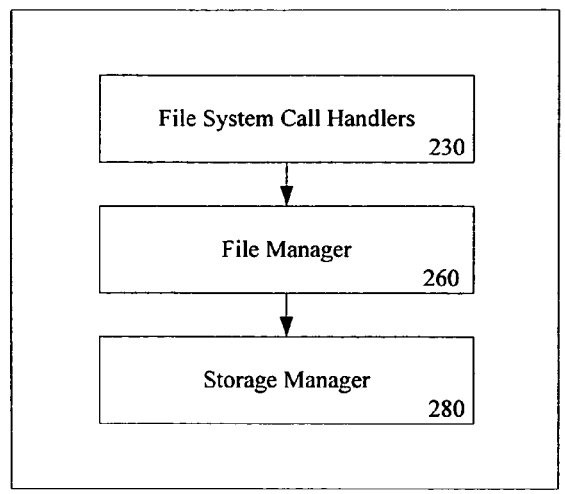
FIGS. 3A and 3B illustrate embodiments of file system calls.
Figure 3B:
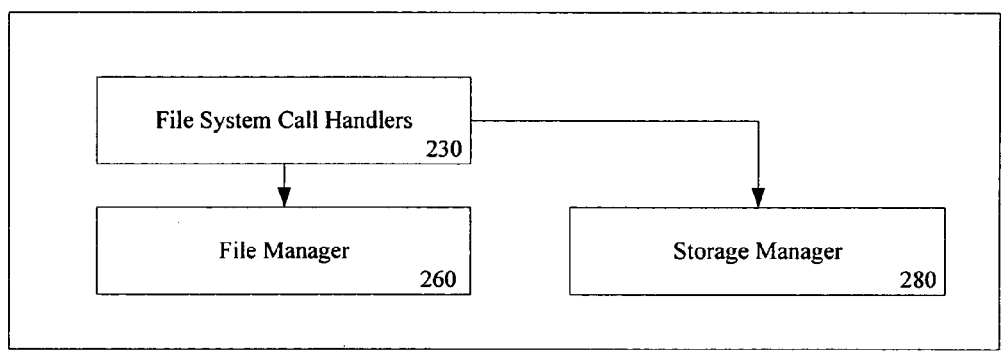

File system call handlers 230 use the distribution manager 250 to locate the directory managers 270 and file managers 260 responsible for files being accessed by the application. Many system calls are essentially passed through to the underlying manager. FIG. 3A illustrates the system call from call handlers 230. Read and write operations, however, can be optimized through a technique called delegation. A file manager 260 can delegate responsibility for a whole file, or a range within the file, to a group of compute nodes 120. The file system call handlers 230 within that group can then communicate directly with the storage managers 280, initiating I/O to disk on their own. FIG. 3B illustrates the system call from call handlers 230 using delegation.

Referring back to FIG. 2, distribution managers 250 also start instances of file system components when necessary. For instance, the first time that a directory is accessed, the distribution manager will select an I/O node 130 as the home of that directory, instantiate a directory manager on that node for the directory, and supply the address of that manager (a message port) to the node which had requested access to the directory. The distribution manager is located using a global, well-known message port. This is in the system-wide message port namespace. The distribution manager is initialized, registering its location under this well-known name, as part of file system bootstrap. Once distribution manager is running, all other file system components are located through its services.

Figure 4:
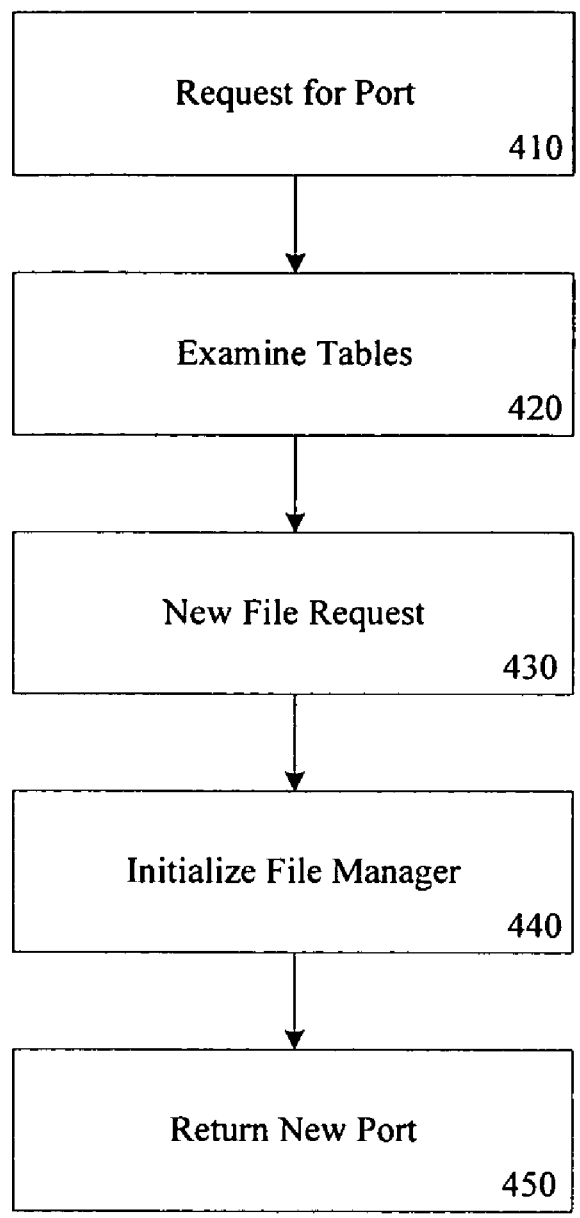
FIG. 4 is a flow diagram illustrating one embodiment of operation for a distribution manager.

FIG. 4 is a flow diagram illustrating the operation of distribution managers 250. At processing block 410, a requesting component sends a request to the distribution manager 250 for the port of the file manager 260 for a file X via a well-known message port. At processing block 420, the distribution manager 250 examines its tables and determines that there is no file manager 260 for file X and selects an I/O node 130 which will host the new file manager 260.

At processing block 430, the distribution manager 250 requests that an operating environment on the selected I/O node 130 create a new file manager 260 for file X. At processing block 440, the file manager 260 is initialized and is assigned a message port. At processing block 450, the new port is returned to the requesting component. The requesting component may then communicate directly with the new file manager.

Lookup results are cached by the requesting component so that the distribution manager 250 is normally accessed only the first time that a file or directory is accessed by an application 210. In one embodiment, the use of shared memory allows all threads or processes within an application 210, even an MPI application, to share this cache. Since the services managed by the distribution manager 250 rarely move between nodes, there is no provision for invalidating caches.

Rather, an attempt to send a message to an invalid message port will fail, prompting the sender to query the distribution manager 250 for the new location of the manager.

Figure 5:
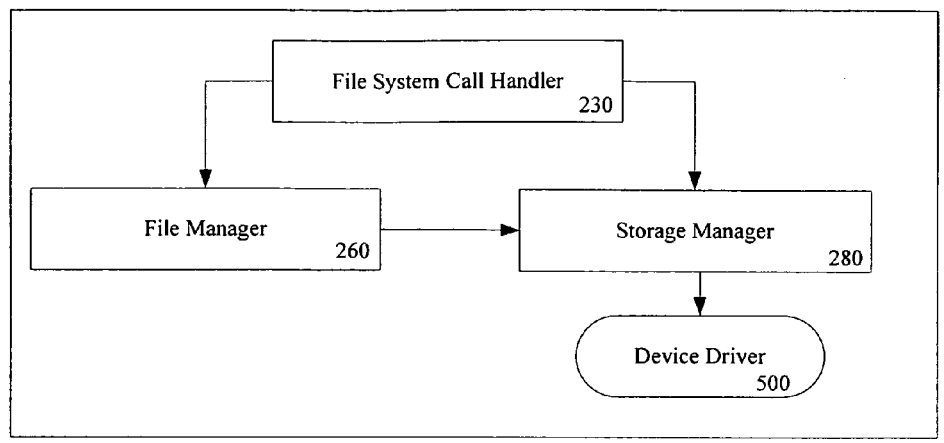
FIG. 5 illustrates one embodiment of data path components.

Referring back to FIG. 2, file manager 260 and storage manager 280, along with file system call handlers 230 and a device driver 500 are data path components. FIG. 5 illustrates one embodiment of the data path components. A file manager 260 coordinates access to a single file. In most cases where a file has been opened only by one application, read and write operations are delegated to the group of compute nodes on which that application runs. In one embodiment, the use of object storage enables the storage devices to manage their own allocation of space and help to ensure a consistent state for the file system in the event of failure.

In some cases, the file manager 260 cannot delegate access to an entire file. For instance, multiple jobs may have opened the file, or the file may be shared via parallel NFS (pNFS). In such instances, the file manager 260 remains involved with file I/O, coordinating cache and metadata consistency, and enforcing POSIX atomicity rules between jobs. In this case, the file manager 260 can choose either to delegate access to ranges of the file or to perform all read and write calls on behalf of its clients.

The file manager is responsible for ensuring POSIX atomicity when required by applications (this is the default for applications written in the C language and those which invoke the POSIX interfaces directly). Applications which do not require atomicity can disable the associated locking through a call to the file manager or through the use of appropriate APIs within libraries such as MPI-IO. Note that for delegated files, the file system call handlers 230 manage atomicity.

A storage manager 280 coordinates access to a single object storage device. The storage manager 280 is invoked by the file manager 260 and directory managers 270, but can also be invoked directly by file system call handlers 230 if the file manager 260 has delegated a portion of a file. This allows most read and write operations to be performed with a single round-trip message.

If there are multiple physical paths to the device, the storage manager 280 is responsible for load balancing and recovery from path failures which leave the device connected along at least one path. Note that the RAS component 290, discussed below, is responsible for determining the existence of a fault and coordinating response to the fault. If multiple paths exist for failover, all paths should be controlled by the same storage manager.

Storage managers 280 do not aggregate multiple devices into a single storage unit (e.g., they are not volume managers). A storage manager 280 need not be located on the node to which the storage device is attached. A storage manager 280 is independent from the device driver 500, and can reside on an I/O node 130 while controlling a storage device attached to a compute node 120, which provides flexibility in system configuration.

Figure 6:
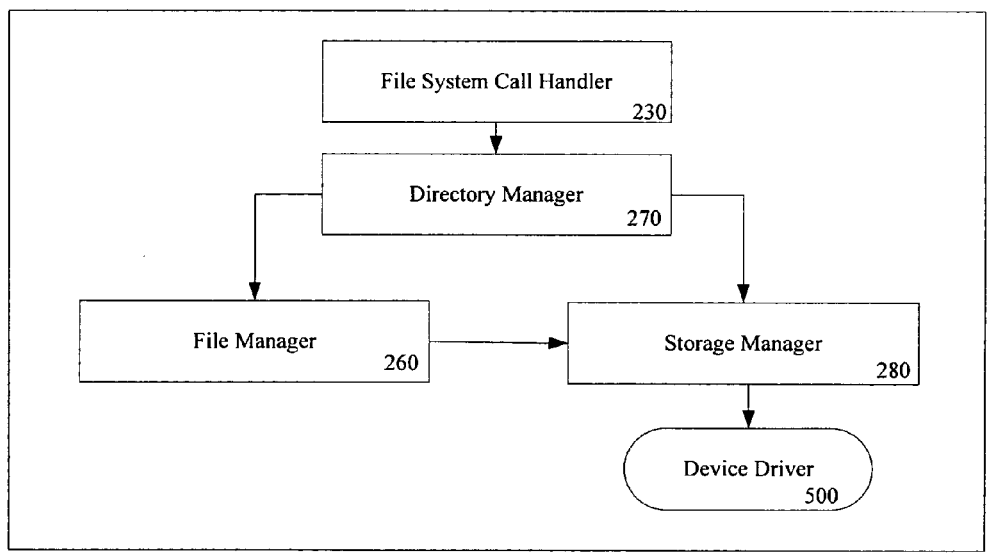
FIG. 6 illustrates one embodiment of metadata components.

Referring back to FIG. 2, directory manager 270, along with file system call handlers 230, file managers 260, storage manager 280 and device driver 500 are meta-data components. FIG. 6 illustrates one embodiment of metadata components. A directory manager 270 coordinates access to a single directory. All lookup operations are performed by the directory manager 270, which thus must be able to handle a heavy load. To facilitate this, directories may be fully cached in the memory of an I/O node while they are in use. Updates may be performed very quickly on the in-memory structures, while a log is used to ensure file system integrity. The log can be stored on non-volatile RAM, when available, for even faster performance.

Figure 7:
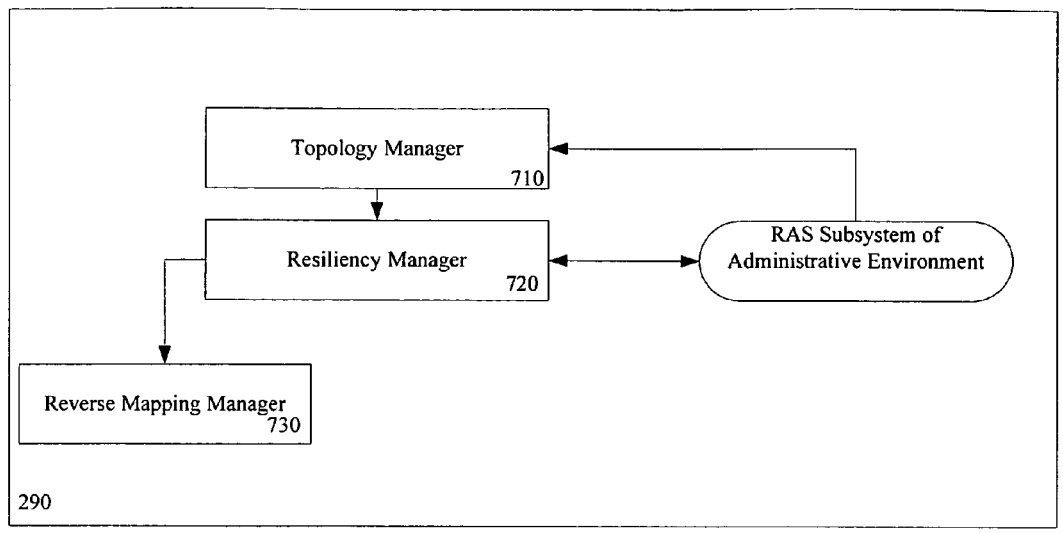
FIG. 7 illustrates one embodiment of a RAS component.

As discussed above RAS component 290 is implemented to determine the existence of faults and to coordinates a response to the fault. FIG. 7 illustrates one embodiment of a RAS component 290. RAS component 290 includes a topology manager 710, resiliency manager 720 and reverse mapping manager 730. The topology manager 710 handles the file system's knowledge of connectivity and fault domains. Topology manager 710 does not discover this information itself, acting instead as an interface to an administrative environment's RAS and connectivity functions.

The topology manager 710 is used for a variety of purposes, including determining all available paths to storage devices, finding storage in separate fault domains, and monitoring changes in system state due to faults during operation. As discussed above, topology manager 710 does not detect the faults, nor respond to them other than by updating its mappings. Rather, topology manager 710 determines faults by registering for notifications from the RAS subsystem of the administrative environment, and propagates them to the resiliency manager 720, as well as to other interested file system components, such as storage managers 280.

The resiliency manager 720 is responsible for ensuring that all file system data and metadata is protected from failures. In one embodiment, a user or application may disable such protection, which may be useful to increase performance for transient data of low value (e.g. debugging output or short-lived temporary files). After a topology change or other fault, the resiliency manager 720 determines which file system objects have been affected. This may be user data or file system metadata, on either stable storage or NVRAM. Resiliency manager 720 manages the process of restoring redundancy (e.g. re-mirroring data), invoking the data scheduler as needed. In the event of the loss of data, resiliency manager 720 notifies the appropriate file system components and informs the RAS subsystem, which can present that information to the administrator.

The reverse mapping manager 730 is used by the resiliency manager 720 to determine which file system objects reside on a given piece of media (e.g., disk, tape, or NVRAM). In the event of media failure, the resiliency manager 720 uses this information to drive the reconstruction or notification process. This information is also used in other cases where knowledge of the objects on media is required, for instance when taking storage out of service. In one embodiment, this information cannot be stored on the media in question, as it is needed if the media becomes unavailable. Reverse mappings are kept up-to-date by components which allocate storage space, for instance, file and directory managers as well as a data scheduler.

Figure 8:
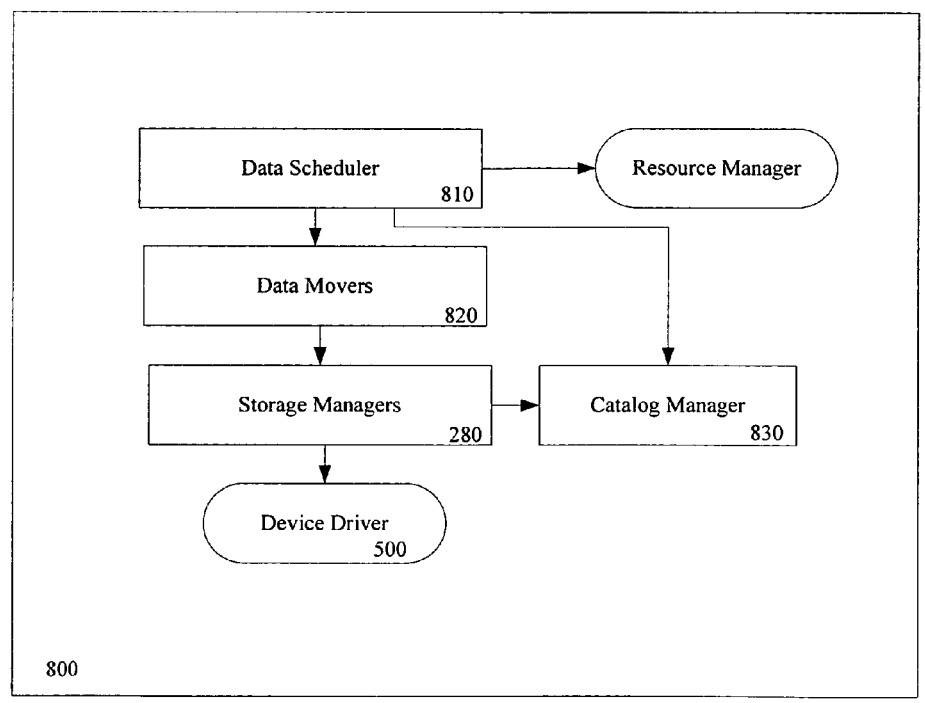
FIG. 8 illustrates one embodiment of data management components.

The file system includes a data management component that supports multiple pools of storage (e.g., high speed disk, high capacity disk, tape, etc.). FIG. 8 illustrates one embodiment of data management components 800. Data management components 800 include data scheduler 810, data movers 820, catalog manager 830, as well as storage manager 280 and device driver 500.

The data scheduler 810 implements policy-based data management for tiers of storage. Data scheduler 810 ensures that multiple copies of data exist for RAS, based on policies set by the administrator. Data scheduler 810 invokes data movers 820 to copy data between storage tiers based on access patterns or other policies. Frequently accessed files can be moved to faster storage tiers, while infrequently accessed files may be moved to slower storage tiers. The data scheduler 810 is also responsible for media migration. Migration is used to protect against media deterioration, move data to new classes of media, and to reclaim space on sequential media.

Data movers 820 are responsible for copying data from one storage tier to another. The storage tiers may utilize disk, tape, or other media. Data movers 820 take advantage of third-party copy whenever possible to avoid impacting the I/O nodes 130. The catalog manager 830 keeps information about individual pieces of media (e.g., disk or tape). Information kept includes an estimate of space utilization, an error history for use by the RAS components 290, and possibly a performance history as well. Space utilization is updated when media is taken offline, or periodically by storage managers. For sequential media, obsolete space is also tracked. In addition to the components described above, the file system can interface with an external resource manager, which allows integration of shared resources such as tape libraries with other file systems.

Figure 9:
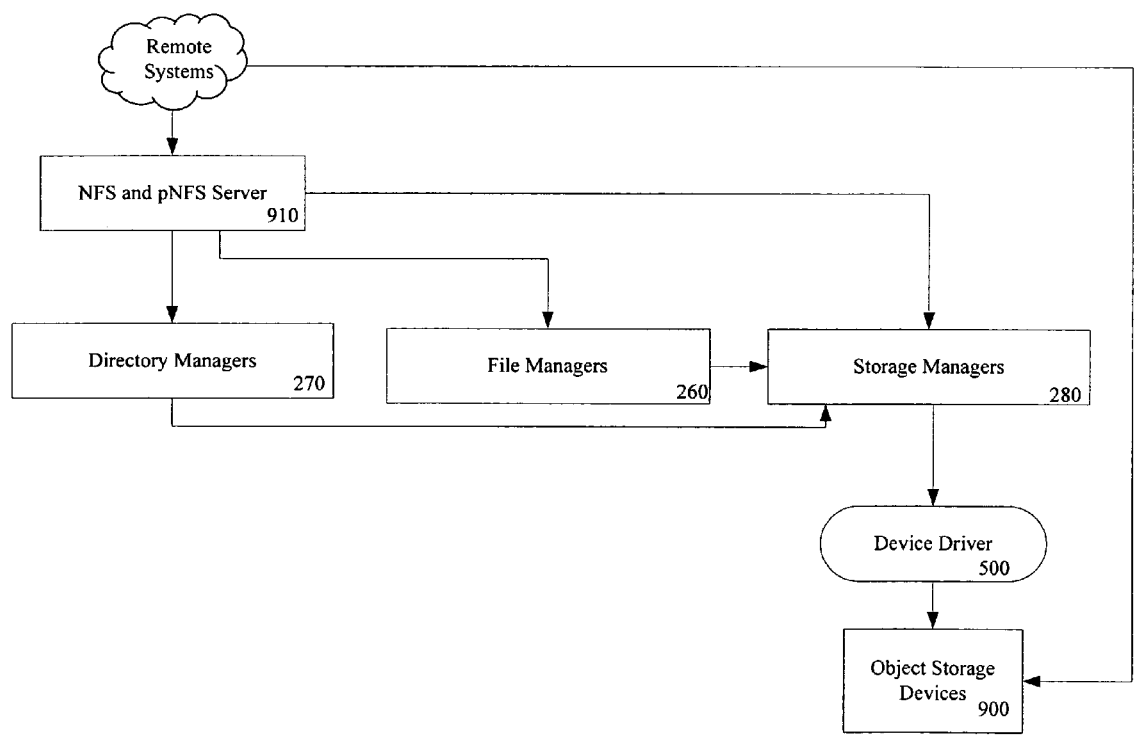
FIG. 9 illustrates one embodiment of data sharing components.

FIG. 9 illustrates one embodiment of data sharing components. Data sharing in the file system can be performed in several ways. A pNFS server 910 allows clients connected to the storage network to access storage devices directly. An integrated object storage security server allows for secure access to disks by untrusted clients. The file system may operate as a client to remote file systems, including pNFS. File system clients may be integrated by third parties. As with standard UNIX systems, this integration is done at a mount point level, with the ability to configure automatic mounts. The shared memory architecture allows file system client code to run on an I/O node while directly delivering data to compute nodes 120.

The file system includes semantic access component that assists in propagating metadata automatically to a private database. Further, the semantic access component supports interfaces to allow users to add metadata to this database. Metadata from well-structured files can be added automatically via plug-ins. The database enables fast criteria-based searching, such as date ranges, user and project identification, etc.

Figure 10:
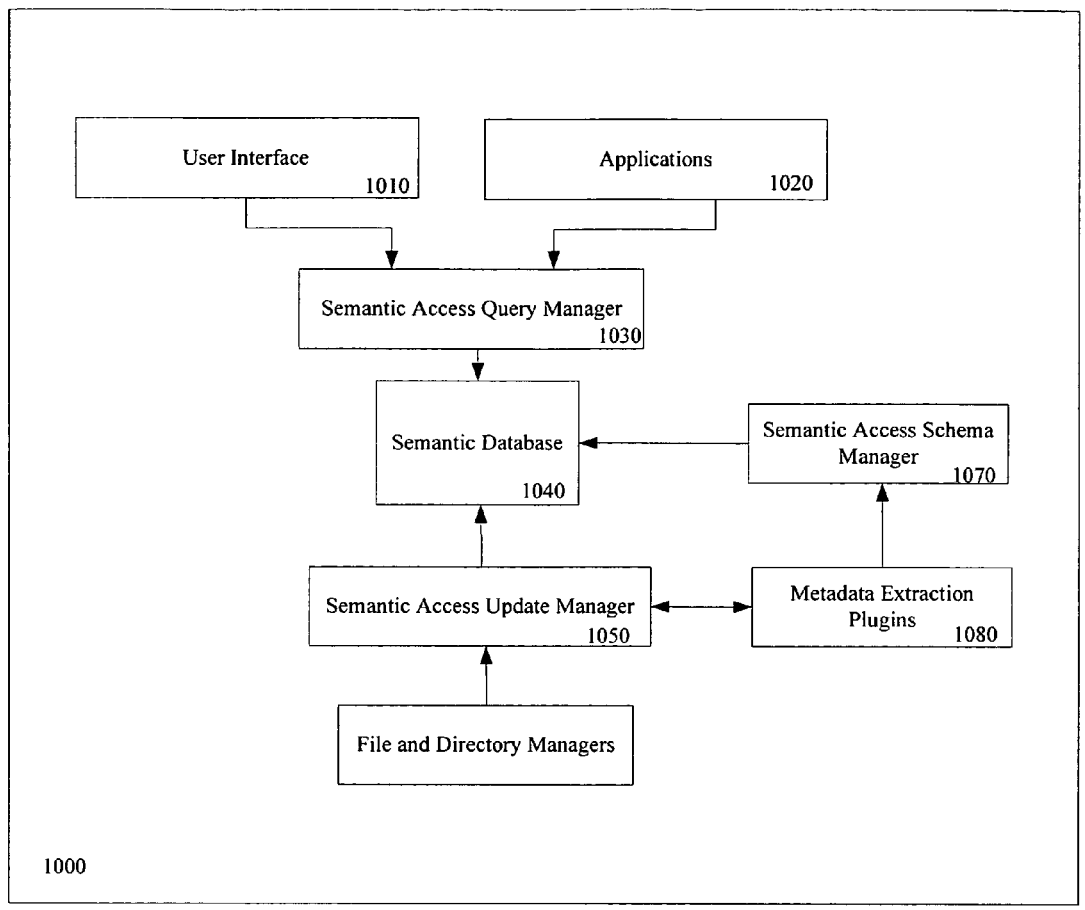
FIG. 10 illustrates one embodiment of semantic access components.

FIG. 10 illustrates one embodiment of semantic access components. A semantic access query manager 1030 provides facilities for searching file system and user-supplied metadata to locate files. Semantic access query manager 1030 utilizes the private database, which is independent from the file system and does not communicate directly with other file system components. A semantic access update manager 1050 monitors changes to the file system and updates the databases used by the semantic access query manager 1030.

Updates are made in the background so that file system performance is unimpeded. A semantic database 1040 can be extended to include metadata derived from file contents. Metadata extraction plug-ins 1080 enable new extraction methods to be defined by a file system administrator. The plug-ins 1080 may be automatically invoked by the update manager 1050 when file contents change. A semantic access schema manager 1070 works with plug-ins 1080 to allow the database schema to be extended for new types of metadata.

Exemplary Computer System

Figure 11:
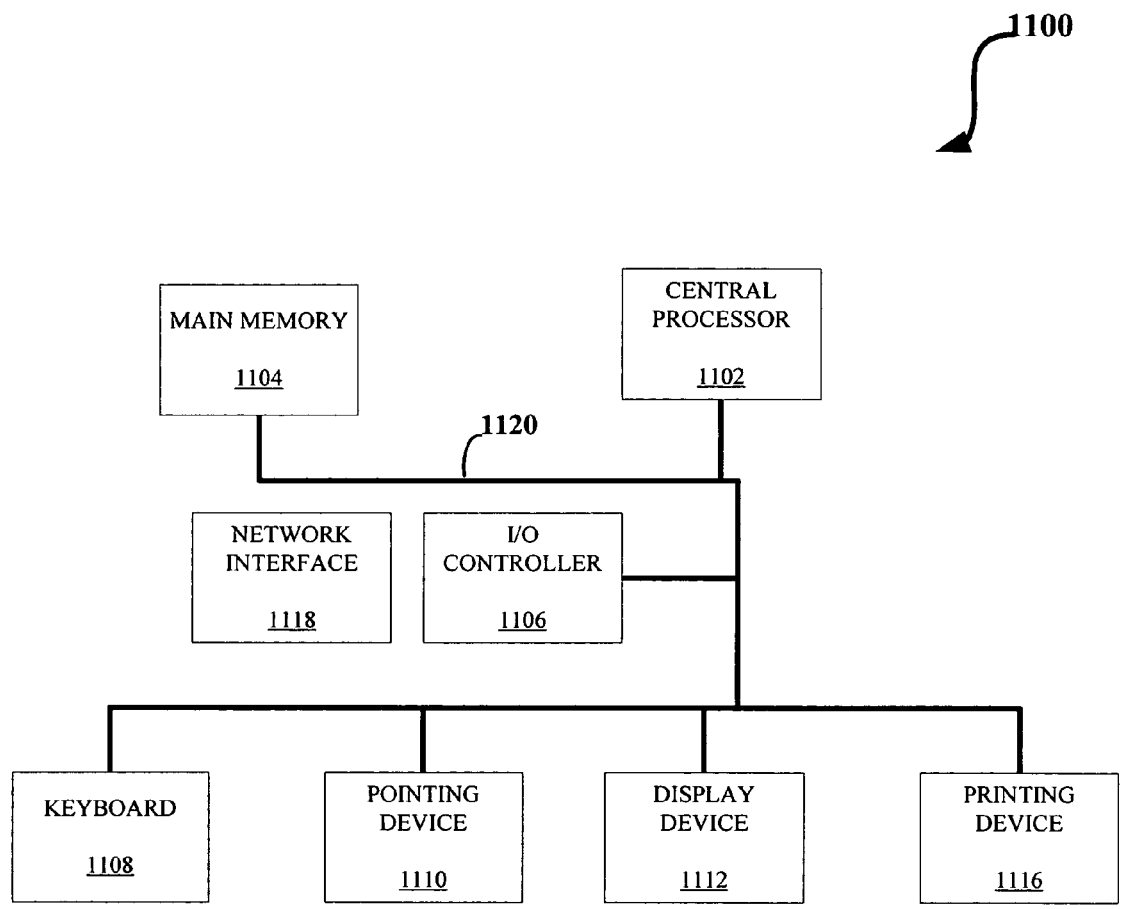
FIG. 11 illustrates one embodiment of a computer system.

FIG. 11 illustrates one embodiment of a computer system 1100 in which various servers, managers and components described above may be implemented. Computer system 1100 comprises a central processor 1102, a main memory 1104, an input/output (I/O) controller 1106, a keyboard 1108, a pointing device 1110 (e.g., mouse, track ball, pen device, or the like), a display device 1112, and the like), and a network interface 1118. Additional input/output devices, such as a printing device 1116, may be included in the system 1100 as desired. As illustrated, the various components of the system 1100 communicate through a system bus 1120 or similar architecture.

In a further embodiment, system 1100 may be a distributed computing system. In other words, one or more of the various components of the system 1100 may be located in a physically separate location than the other components of the system 1100. Such components may be accessed and connected via a network to the other components In accordance with an embodiment of the present invention, the computer system 1100 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention.

Also, instead of a single processor, two or more processors (whether on a single chip or on separate chips) can be utilized to provide speedup in operations. It is further envisioned that the processor 1102 may be a complex instruction set computer (CISC) microprocessor, a reduced instruction set computing (RISC) microprocessor, a very long instruction word (VLIW) microprocessor, a processor implementing a combination of instruction sets, and the like.

The network interface 1118 provides communication capability with other computer systems on a same local network, on a different network connected via modems and the like to the present network, or to other computers across the Internet. In various embodiments of the present invention, the network interface 1118 can be implemented utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, wireless networks (such as those implemented by utilizing the wireless application protocol (WAP)), time division multiplexing (TDM), universal serial bus (USB and its varieties such as USB II), asynchronous transfer mode (ATM), satellite, cable modem, and/or FireWire.

Moreover, the computer system 1100 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 1100 is a general purpose computer capable of running any number of applications such as those available from companies including Oracle, Siebel, Unisys, Microsoft, and the like.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A distributed file system comprising:
   a plurality of input/output (I/O) nodes;
   a plurality of compute nodes communicably coupled to the plurality of I/O nodes through an interconnect, each including:
   applications to perform specific functions and perform I/O functions through libraries; and
   file system call handlers capable of providing application programming interfaces (APIs) to facilitate communication between the plurality of I/O nodes and the applications, wherein the file system call handlers use a message port system to communicate with other compute nodes and I/O nodes.

2. The distributed file system of claim 1, further comprising a data management component capable of supporting multiple pools of storage media.

3. The distributed file system of claim 2, wherein the data management components includes one or more of the following:
   a data scheduler to implement policy-based data management of tiers of data storage;
   one or more data movers which are responsible for copying data from a first storage tier to a second storage tier;
   a catalog manager which keeps media information including estimate of space utilization, error history, and performance history;
   a storage manager used to add and remove storage media; and
   device drivers used to control the storage media and distributed file system components.

4. The distributed file system of claim 3, wherein the data scheduler is configured to move frequently accessed files to faster storage tiers.

5. The distributed file system of claim 3, wherein the data scheduler is configured to move infrequently accessed files to slower storage tiers.

6. The distributed file system of claim 4, wherein the data scheduler is responsible for media migration to protect against media deterioration.

7. The distributed file system of claim 2, further comprising a semantic access component to assist in automatically propagating metadata associated with files stored on the storage media to a private database.

8. The distributed file system of claim 7, wherein the semantic access component includes:
   a semantic access query manager to assist in locating files by searching for file system and user-supplied metadata; and
   a semantic access update manager to monitor changes to the file system and update a database used by the semantic access query manager accordingly.

9. The distributed file system of claim 1, wherein each of the input/output nodes include one or more of a file manager, a directory manager, storage manager, and a RAS component.

10. The distributed file system of claim 9, wherein the file system call handlers use a distribution manager associated with the I/O node to locate the directory manager and a file manager associated with the I/O node which is responsible for files being accessed by the application.

11. The distributed file system of claim 9, wherein the file system call handlers invoke the use of a storage manager to coordinate access to a single object storage device.

12. The distributed file system of claim 8, wherein the file system call handlers uses a RAS component associated with an I/O node to determine the existence of faults and to coordinate the response to the fault, wherein the RAS component includes:
   a topology manager configured to handle the distributed file system's knowledge of connectivity, determine faults by registering for notifications from the RAS component of an administrative environment, and propagate the determined faults to other distributed file system components;
   a resiliency manager to ensure that all file system data and metadata is protected from failures by determining file system object failures from notifications received from the topology manager and restoring redundancy;
   a reverse mapping manager used by the resiliency manager to determine which file system objects reside on a given piece of storage media.

13. The distributed file system of claim 1, further comprising distributing and load balancing components across the plurality of I/O nodes.

* * * * *